United States Patent

Boxman et al.

[15] 3,678,182

[45] July 18, 1972

[54] CHROMA KEY CIRCUIT

[72] Inventors: Peter Boxman, Clifton; Frederik Johannes Van Roessel, Mahwah, both of N.J.

[73] Assignee: Philips Broadcast Equipment Corporation, Mortvale, N.J.

[22] Filed: March 12, 1971

[21] Appl. No.: 123,690

[52] U.S. Cl. ......................178/5.4 R, 178/DIG. 6, 178/5.2 R

[51] Int. Cl. ..........................................................H04n 9/02

[58] Field of Search.........................178/5.2, 5.4, 6.8, DIG. 6

[56] References Cited

UNITED STATES PATENTS

| | | | |
|---|---|---|---|
| 2,723,307 | 11/1955 | Baracket et al. | 178/DIG. 6 |
| 3,595,987 | 7/1971 | Vlahos | 178/5.2 R |
| 3,619,495 | 11/1971 | Ito et al. | 178/6.8 |

*Primary Examiner*—Richard Murray
*Attorney*—Frank R. Trifari

[57] ABSTRACT

A circuit for generating an output pulse upon the occurrence of a selected color in color television signals features a matrix to form two chrominance difference signals. Four variable gain amplifiers multiply the difference signals by the sine and cosine of a control voltage which is a course color control. Two circuits each comprising a summer, inverter, and clamp circuit each add the outputs of two of the multiplied signals. An AND gate combines the output of the summer circuits and also is coupled to a variable bias supply, which is a fine color control. A delay line, a second AND gate, and a clipper and zero reference then shape the output pulse.

11 Claims, 11 Drawing Figures

INVENTORS
PETER BOXMAN
FREDERIK J. VAN ROESSEL
BY
[signature]
AGENT

INVENTORS
PETER BOXMAN
FREDERIK J. VAN ROESSEL
BY
[signature]
AGENT

INVENTORS
PETER BOXMAN
FREDERIK J. VAN ROESSEL
BY
AGENT

INVENTORS
PETER BOXMAN
FREDERIK J. VAN ROESSEL
BY
[signature]
AGENT

CHROMA KEY CIRCUIT

BACKGROUND

This invention relates to a circuit for cutting off the video signal of one camera and substituting that of another camera during the occurrence of a selected color from said first camera.

Typical prior art devices utilize simple variable resistor matrices to select the trigger color. However, such systems have very poor color selectivity, and are cumbersome to operate by remote control because there are three controls.

It is therefore an object of the present invention to have chroma key circuit with a high degree of color selectivity.

It is another object to have such a circuit suitable for remote control.

It is still another object to have such a circuit controlled by a single knob control.

In brief, these and other objects are achieved by means of a plurality of variable gain amplifiers which multiply the color signals by the sine and cosine function of a single control voltage, which selects the trigger color. The multiplied signals are then combined in summers, and then are applied to an AND gate. A variable bias supply can be connected to the AND gate to act as a fine color control.

Other objects, and advantages will become apparent from the description when, taken in conjunction with the drawings in which.

Figure 2:
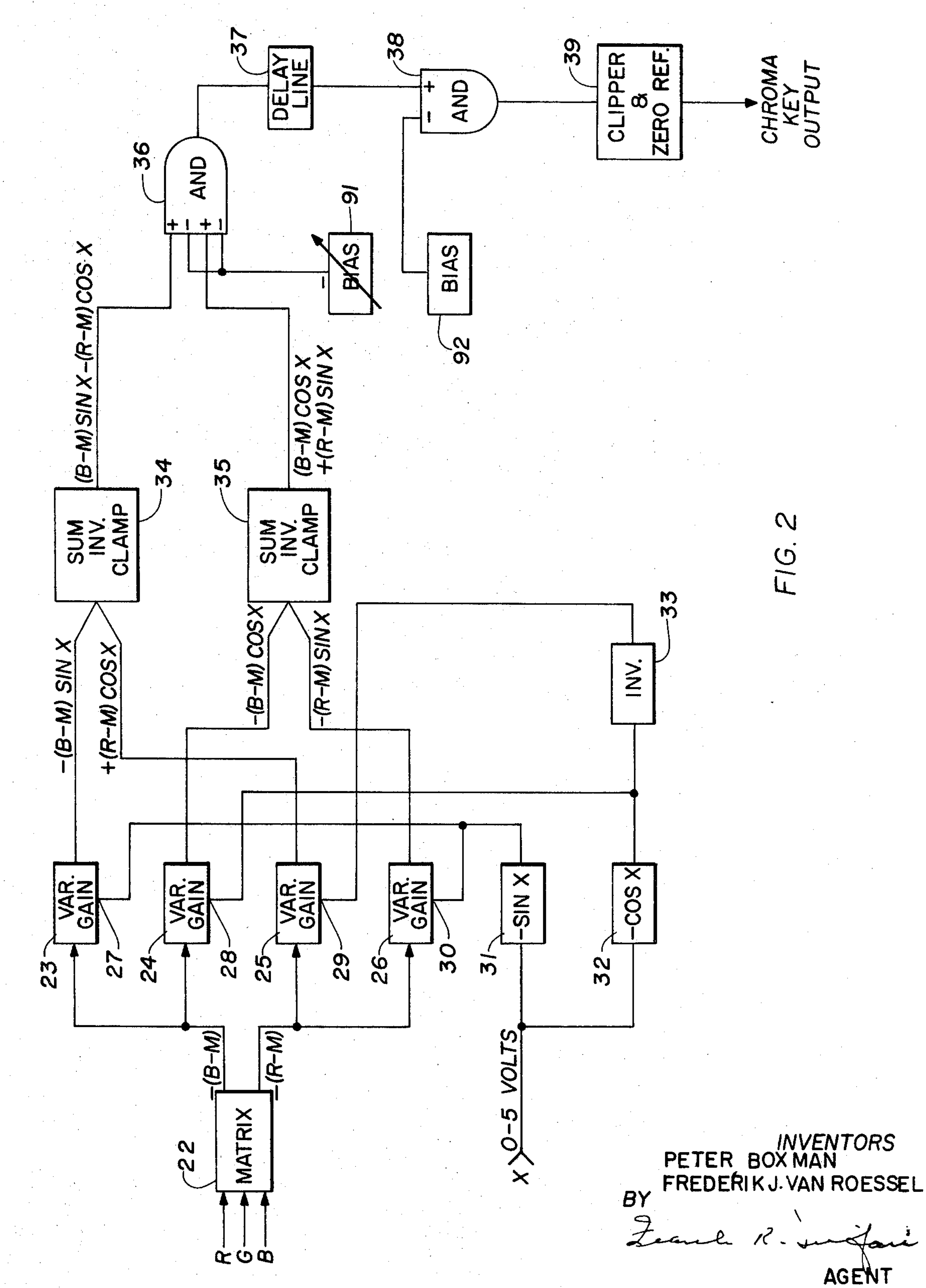
FIG. 2 is a block diagram of the chroma key circuit.
Figure 3:
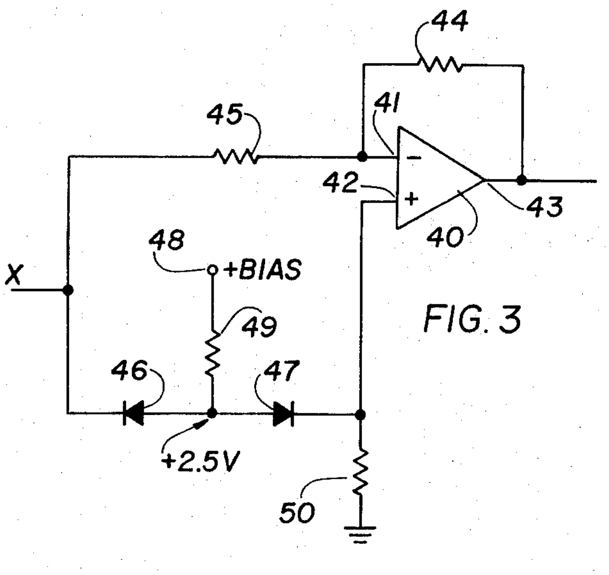
FIG. 3 is a schematic diagram of a block in FIG. 2.
Figure 4:
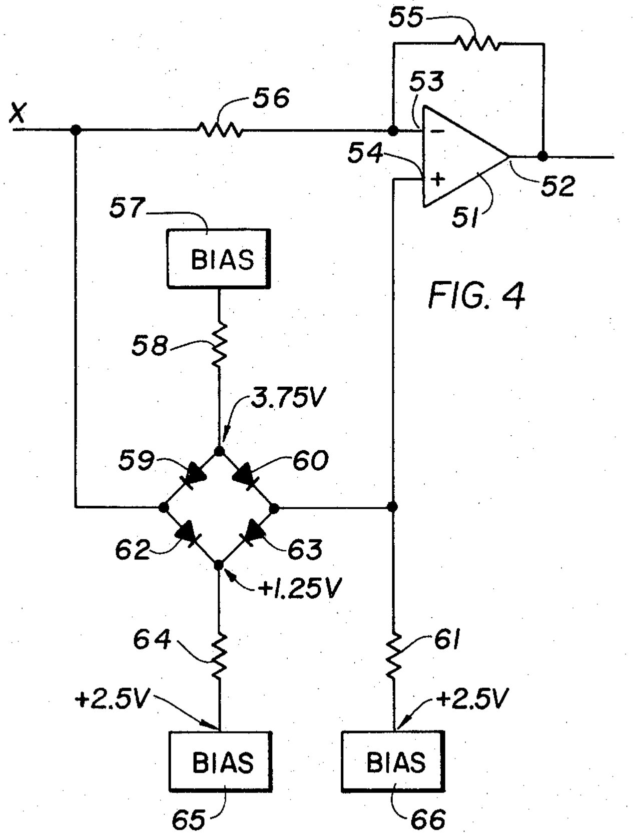

FIGS. 3 *a*, *b*, *c* are graphs of voltage transfer functions of FIG. 3;

FIG. 4 is a schematic diagram of another block in FIG. 2;

FIGS. 4 *a* and *b* are graphs of voltage transfer functions of FIG. 4; and

Figure 5:
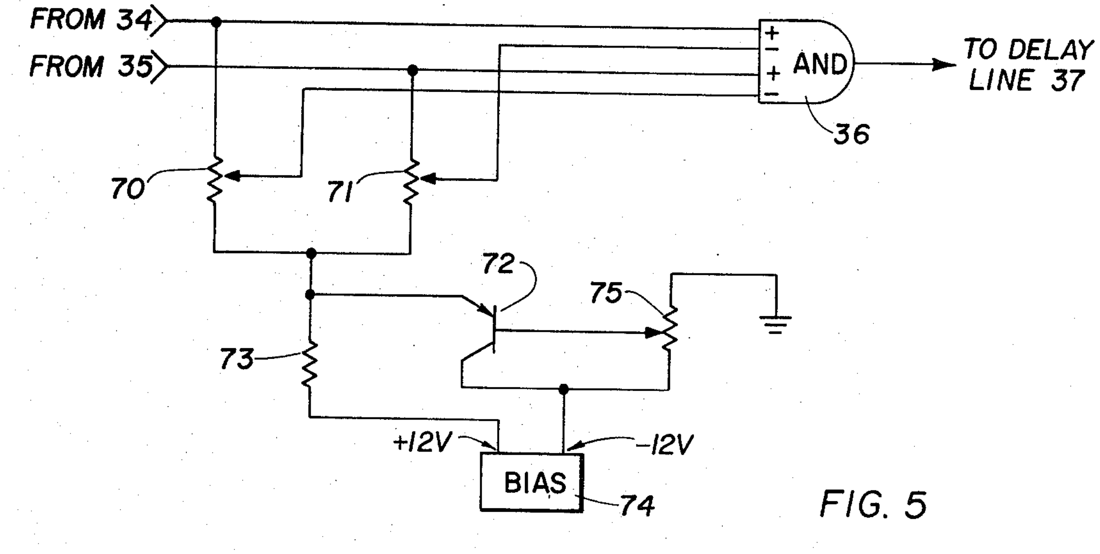
Figure 6:
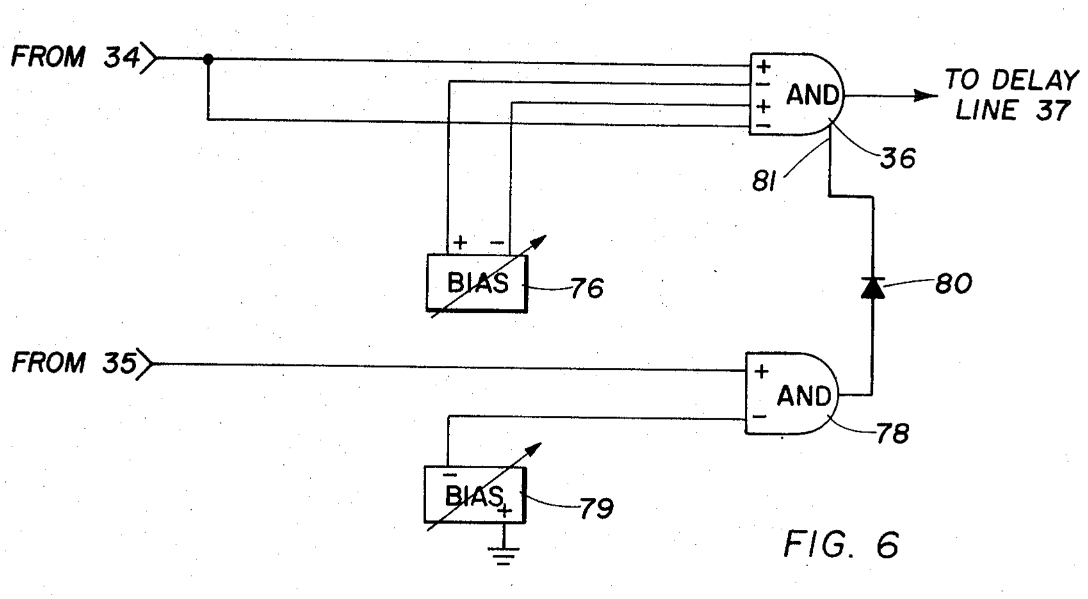

FIGS. 5 and 6 are alternate embodiments of a block in FIG. 2.

Figure 1:
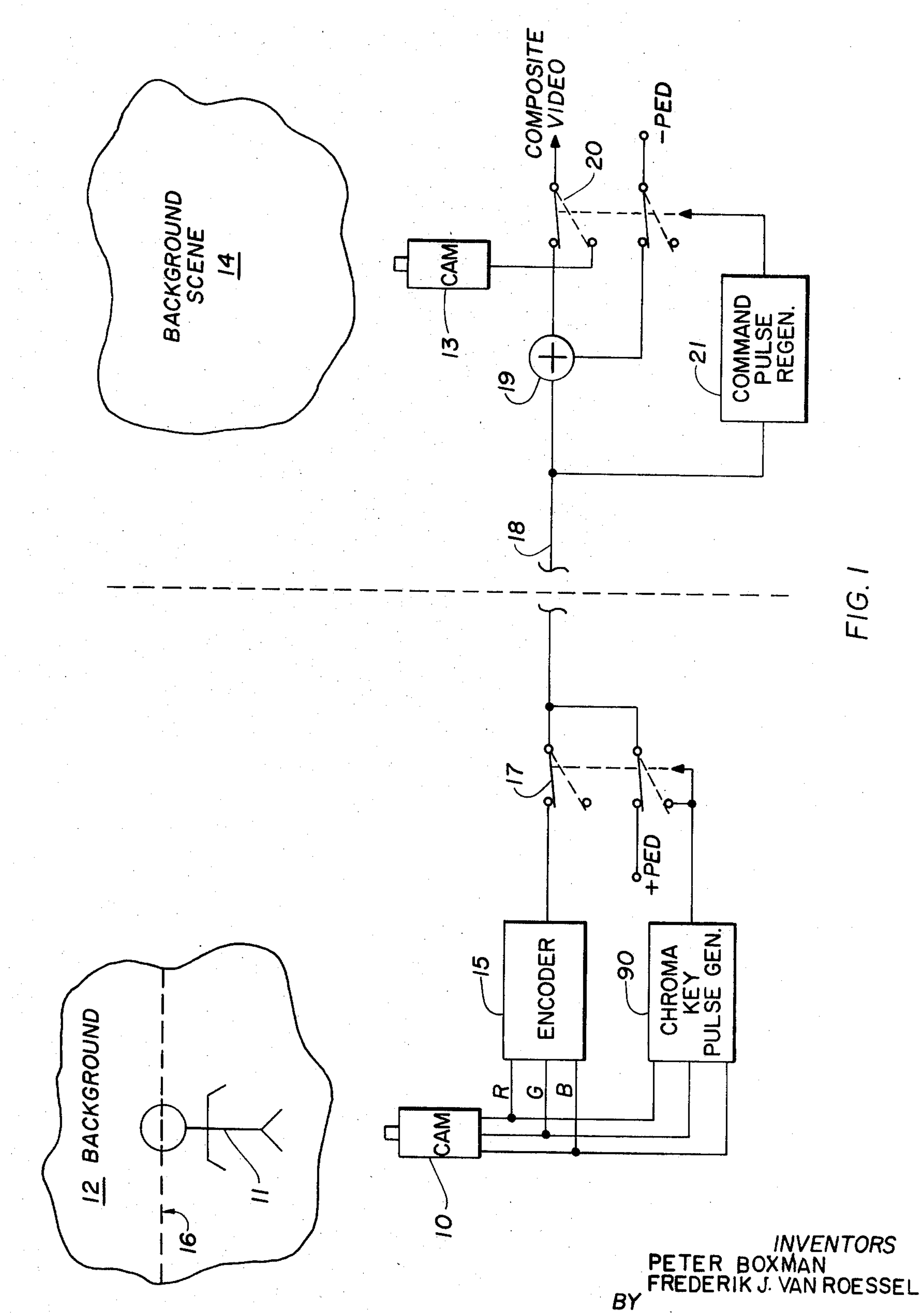
FIG. 1 is a block diagram of the overall system.

FIG. 1 shows the basic overall system of the invention. A first camera 10 is viewing a scene consisting of, for example, a person 11 against a background 12, which for example, may be blue in color. A second camera 13 is viewing a background scene 14, such as a street scene, a landscape, or other forms of desired background. It is desired to add the figure 11 into the background scene 14 in the final video output signal. To accomplish this in accordance with the invention, the system comprises an encoder 15, which takes the red, green, and blue color components coming from the camera 10 and encodes them into a single composite signal. Assume that the camera 10 is scanning along a particular scanning line 16, and at a particular instant the video signal coming from camera 10 corresponds to the head of figure 11. Then the video signal from the encoder 15 will pass through the switch 17, which is in the position shown by the solid line, and along a cable 18 to the adder 19. The lower half of switch 17, which is also in the position indicated by the solid lines, is coupled to a source of positive pedestal voltage, which is added to the output of the encoder 15 to prevent the output signal from going negative thereby to prevent distortion. At the location of camera 13, switch 20 is in the position shown by solid lines, and therefore, a source of negative pedestal voltage is applied to the adder 19 so that it cancels the positive pedestal voltage applied at switch 17. Therefore, the output of adder 19 is a video signal representing the figure 11, and this signal is passed on to other circuits (not shown) within the television studio. Since, in the assumed example, the chroma key 90 generates a pulse upon the occurrence of a blue signal, when the camera 10 is scanning the blue background 12, which is to the right of figure 11, the chroma key 90 will generate a control pulse to move the switch 17 into the lower position as shown by the dotted lines. This chroma key pulse will then go through the lower portion of switch 17, along the cable 18, and into the command pulse regenerator 21. Here the key pulse will be regenerated and will actuate the switch 20 to go into the lower dotted position. In this position the video signal from camera 13 will go through switch 20 and on to the other portions of the television studio. Therefore, it will be seen that the video signal from the figure 11 will be superimposed upon the background scene 14 in the output composite video signal. In general, it is desired to have the chroma key 90 adjustable, so that it will generate a keying pulse upon the occurrence of a selected color. This enables its use with any color for the background 12.

FIG. 2 shows in more detail the adjustable chroma key pulse generator 90. The input red, green, and blue color component signals from the camera 10 are applied to a matrix 22 which forms two output signals, −(B−M), and −(R−M). By "M" is meant a luminance signal, which can be composed of equal proportions of the R,G, and B signals, or other proportions which may give better results. As is well known in the art, the color difference signals contain the same information as the original color signals albeit in different form. The first of these signals, −(B−M), is applied to the inputs of two variable gain amplifiers 23 and 24; and the second of these signals, −(R−M), is applied to the inputs of variable gain amplifiers 25 and 26. Amplifiers 23, 24, 25, and 26 have amplification gain control terminals 27, 28, 29, and 30 respectively. The gain of these amplifiers linearly varies from −2 to +2 over an input gain control voltage range of 0 to 2 volts. A manually adjustable input control voltage labelled "X" varies from 0 to 5 volts and is applied to DC control voltage generators 31 and 32. Control voltage generator 31 generates a triangular approximation to the −sine of the input voltage, while control voltage 32 generates a triangular approximation to the −cosine of the input voltage X. The −sin X voltage from generator 31 is applied to terminals 30 and 27 of amplifiers 26 and 23 respectively. The variable gain amplifiers generate output signals which are equal to the negative (due to the phase inversion within the amplifiers) of the product of the color and gain control signals. Therefore, amplifiers 23 and 26 generate the −(B−M) sin X voltage and the −(R−M) sin X voltage respectively. The −cos X voltage is applied to terminal 28 of amplifier 24, which thereby generates the −(B−M) cos X voltage. The −cos X voltage is also applied to an inverter 33 whose output voltage, cos X, is in turn applied to variable gain amplifier 25, which therefor generates the (R−M) cos X voltage. In other words, the color difference signals coming out of the variable gain amplifiers have an amplitude which is controlled from the input voltage X in accordance with either the cosine or the sine of X, as determined by the circuits 31 and 32. As is known in the art, by varying the amplitudes of sinusoidal and cosinusoidal color difference signals, any resultant color can be generated. Thus, by varying the voltage "X" the color which will cause the key 90 to generate a key pulse can be selected. The voltage X serves as a course color selection for the key 90. The outputs of amplifiers 23 and 25 are applied to circuit 34 which is a summer, inverter, and a clamp, in the order recited. The output of circuit 34 is therefore a [(B−M) sin X] − [(R−M) cos X] voltage. Likewise the output signals of amplifiers 24 and 26 are applied to a circuit 35 which also is a summer, inverter, and a clamp, and which therefore generates a (B−M) cos X + (R−M) sin X voltage. The output signals from circuits 34 and 35 are applied to the non-inverting inputs of AND gate 36. This AND gate 36 can be a Fairchild type 711, which generates a low output pulse when both non-inverting inputs are low, i.e., it is a negative logic AND gate. Applied to the inverting inputs of the AND gate 36, is a variable negative bias supply 91 which will determine the trigger level of the AND gate 36. This variable bias supply 91 serves as a fine color adjust for the chroma key circuit. The output signal from AND gate 36 is applied to a delay line 37, which corrects for delay in the encoder 15. The output signal of delay line 37 is applied to the non-inverting input of an AND gate 38 which can be a Fairchild type 710 and which has applied to its inverting input a bias voltage from supply 92, which is set to about half of the peak value of the pulse, and thus reshapes the pulse coming from delay line 37. The output signal from AND gate 38 is applied to the clipper and zero reference 39 which clips the output pulse to a half a volt maximum value and sets a zero reference to correct for tolerance of the components of the system. Thus in operation the voltage X would be varied to coursely select the background 12 color upon which a pulse will appear out of the clipper 39, and the variable bias applied to AND gate 36 would select a fine adjustment of this color.

Figure 3A:
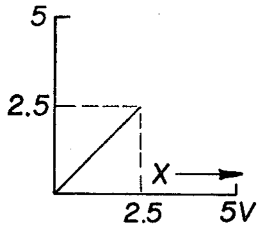
Figure 3B:
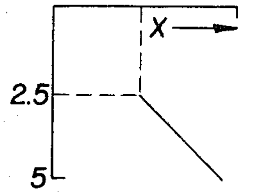
Figure 3C:
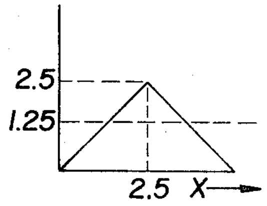

FIG. 3 shown the details of the cosine generator 32 of FIG. 2. An operational amplifier 40, which can be a Fairchild type 741, has an inverting input 41, a non-inverting input 42, and an output terminal 32. A feedback resistor 44 coupled between input 43 and the inverting input 41 equals the input resistor 45, and therefore the gain of the input voltage X through the inverting input 41 to the output 43 is equal to −1. Oppositely poled series connected diodes 46 and 47 are coupled between the non-inverting input 42 and the source of input voltage X. A source of positive bias potential (not shown) is coupled to the terminal 48 and it together with the resistor 49 and 50 bias the junction of the diodes 46 and 47 to a potential of +2.5 volts. Therefore, if the input potential is below 2.5 volts it will flow through the diodes 46, 47 and into the terminal 42. The gain between the non-inverting input 42 and the output 43 is equal to 2, and therefore if the input voltage X is below 2.5 volts the resulting output voltage at terminal 43 will be the sum of the gain through the inverting input terminal 41, which has a gain of −1, and the non-inverting input 42, which has a gain of +2. This results in overall system gain of +1. This is shown in FIG. 3*a*, which shows the output voltage graphed as a function of the input voltage X. When the input voltage X exceeds 2.5 volts the diode 46 becomes reversed biased, opening input terminal 42 from the input voltage, and the gain is therefore −1, as is shown in FIG. 3*b* which is drawn with the same horizontal axis as that of FIG. 3*a*. Therefore, the input-output transfer function of the entire cosine generator is shown in FIG. 3*c*, which shows a first portion increasing for the first 0 to 2.5 volts of the input signal and a second decreasing portion for the 2.5 to 5 volts range of the input signal. It will be appreciated that if a −1.25 volts negative bias is applied to the output voltage, the overall triangular waves form would be shifted downward by this amount. This results in an approximation to the −cos X voltage, which is required by the variable gain amplifier 24.

Figure 4A:
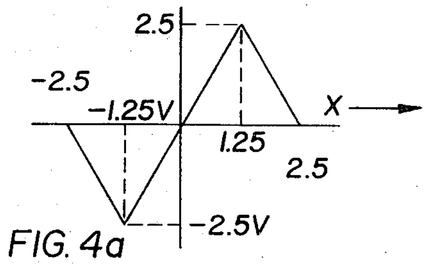
Figure 4B:
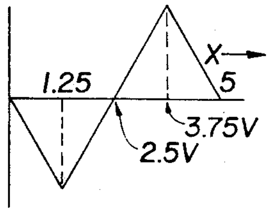

FIG. 4 shows the details of the sine generator 31 of FIG. 2. It also comprises an operational amplifier 51 also a Fairchild type 741 having an output 52, an inverting input 53, and a non-inverting input 54. The feedback resistor 55 and the input resistor 56 are equal and therefore the gain of the input voltage X through the inverting input 53 to the output 52 is equal to −1. The bias supply 57 is coupled through a resistor 58 to the oppositely poled series connected diodes 59 and 60 which are coupled between the non-inverting input 54 and the source of the input voltage X. The resistor 61 is coupled to the diode 60. Assume that the bias supply 57 with the resistor 58 biases the junction of the diodes 59 and 60 to that of +1.25 volts, and also assume that the resistor 61 is grounded at the end that is indicated to be connected to a bias supply 66 of +2.5 volts. The aforesaid components will then act similarly to the corresponding components of FIG. 3, and will give an input output transfer function as shown in the right hand portion of FIG. 4*a* where X has a positive value. This is very similar to that shown in FIG. 3*c* except that the break point occurs at X equals +1.25 volts. The other diodes of the bridge network, namely diodes 62 and 63, are also oppositely poled and have their junction connected to a bias resistor 64 which is coupled to a bias supply 65. Assume that the bias supply 65 together with the resistor 64 biases the junction of the diodes 62 and 63 to a potential of −1.25 volts. Therefore, since diodes 62 and 63 are poled opposite with respect to diodes 59 and 60 respectively, these components will give a transfer function as is shown in the left hand of FIG. 4*a* with a break point of −1.25 volts. Since X, the control voltage, is only a positive value it is desired to shift the entire transfer function as shown in FIG. 4*a* to the right. This is accomplished by adding 2.5 volts to the previously mentioned potential of bias supply 65, as well as that to the previously mentioned zero potential of bias supply 66 coupled to the resistor 61. This results in the junction of diodes 59 and 60 being at a potential of +2.5 and +1.25 = +3.75 volts, and the junction of diodes 62 and 63 being at a potential of +2.5−1.25 = +1.25 volts. This moves all the breakpoints to the right as required, and the result as is shown in FIG. 4b. It will be seen therefore, that the generator 31 generates a triangular approximation to the −sin X voltage.

FIG. 5 shows alternative ways of biasing the AND gate 36 so as to achieve a more accurate fine color control. As in FIG. 2, the output signals from the summer, inverter, and clamp circuits 34, 35 are applied to the respective non-inverting inputs of the AND gate 36. However, instead of just having a selectable fixed bias on the inverting inputs of the AND gate 36, there is in addition, a bias proportional to the signal present at the non-corresponding non-inverting input. This is achieved by having the tapped resistor 70 apply a portion of the signal coming from circuit 34 to the inverting input of AND gate 36 which is associated with the inverting input of AND gate 36 to which the signal from circuit 35 is applied. Likewise the resistor 71 applies a signal coming from circuit 35 to the inverting input of the AND gate 36 which is associated with the non-inverting input of said AND gate to which is applied the signal from circuit 34. The proportion of these signals which are applied to the inverting inputs are normally equal and would be fixed set initially. To apply a selectable fixed bias to the inverting inputs, a transistor 72 is coupled as an emitter follower with the resistor 73 coupled to the bias supply 74. The use of an emitter follower circuit is desirable so that a low AC impedance is presented to the lower ends of the resistors, 70, 71. A potentiometer 75 applies selectable bias to the base of the transistor 74, thereby adjusting the amount of potential at the lower ends of the resistors, 70, 71. In operation, the voltage dividing ratio of the resistors, 70, 71 will effect a fine selection of the color upon which the overall chroma key will trigger, and the adjustment of the resistor 75 will control the saturation of the color upon which the overall key will trigger. It will therefore be seen, that extremely fine control of the overall circuit is obtained.

FIG. 6 shows a third way of achieving more color selectivity. The signal from the circuit 34 is applied a non-inverting input and a non-corresponding inverting input of the AND gate 36. A variable bias supply 76 has a positive voltage output coupled to the remaining inverting input and an equal but negative voltage output coupled to the remaining non-inverting input. By adjusting the voltages from bias supply 76, the triggering color is selected. The signal from the circuit 35 is applied to the non-inverting input of an AND gate 78. A variable bias supply 79 supplies a negative bias to the inverting input of said AND gate 78, and the output of said AND gate 78 is coupled through a diode 80 to an inhibit terminal 81 on the AND gate 36. By adjusting the variable bias supply 79, the saturation of the color on which the chroma key is to trigger can be selected.

It is to be understood that many other embodiments are possible without departing from the spirit and scope of the invention.

What is claimed is:

1. A circuit for generating an output pulse upon the occurrence of a selected color in a plurality of color components signals, comprising means for receiving a control voltage, means for generating a voltage having a value substantially equal to the sine of said control voltage, means for generating a voltage having a value substantially equal to the cosine of said control voltage; first means for multiplying a first of said component signals by said sine voltage, second means for multiplying said first component signal by said cosine voltage, third means for multiplying a second of said component signals by the negative of said cosine voltage; fourth means for multiplying said second component signal by said sine voltage;

first means for adding the multiplied signals from said first and third multiplier means, second means for adding the multiplied signals from said second and fourth multiplier means, and means for combining the outputs of both of said adding means, thereby to produce an output pulse upon the occurrence of a selected color in said component signals.

2. A circuit as claimed in claim 1 further comprising a matrix having an input for receiving red, blue, and green color signals and an output means for applying luminance color difference signals to said respective multiplier means, said luminance color difference signals being said color component signals.

3. A circuit as claimed in claim 1 wherein said each of said generating means comprises an amplifier having inverting and non-inverting inputs, and an output; a feedback resistor coupled between said inverting input and said output; an input resistor coupled to receive said control voltage and to said inverting input; a first pair of oppositely poled series coupled diodes having an end coupled to said non-inverting input and a remaining end coupled to receive said control voltage; and first means for biasing the junction of said first pair of diodes.

4. A circuit as claimed in claim 3 wherein said cosine generating means said biasing means biases the junction to a potential approximately equal to one-half of said control voltage maximum value.

5. A circuit as claimed in claim 3 wherein said sine generating means said first biasing means biases said junction to a potential approximately equal to three-quarters of said control voltage maximum value, and further comprising a second pair oppositely poled series coupled diodes, said pair having its ends coupled to said first diode pair ends respectively; and second means for biasing the junction of said second diode pair to a potential approximately equal to one-quarter of said control voltage maximum value.

6. A circuit as claimed in claim 1 wherein said combining means comprises an AND gate having two non-inverting inputs coupled to said adding means respectively, two inverting inputs corresponding to said non-inverting inputs respectively, and an output for providing said output pulse; and means for biasing said inverting inputs.

7. A circuit as claimed in claim 6 wherein said biasing means comprises a bias supply connected to said inverting inputs.

8. A circuit as claimed in claim 6 wherein said biasing means comprises a pair of tapped resistors each having one end coupled to said non-inverting inputs respectively, said taps being coupled to the non-corresponding inverting inputs respectively; and a bias supply coupled to the remaining ends of said resistors.

9. A circuit as claimed in claim 8 further comprising a transistor emitter follower coupled between said bias supply and said resistors.

10. A circuit as claimed in claim 1 further comprising a delay line coupled to said combining means; an AND gate having a non-inverting input coupled to said delay line, an inverting input, and an output; a bias supply coupled to said inverting input; and a clipping and zero reference means coupled to said AND gate output.

11. A circuit as claimed in claim 1 wherein said combining means comprises a first AND gate having two inverting inputs, two corresponding non-inverting inputs, an inhibit input, and an output for providing said output pulse; an inverting input and the non-corresponding non-inverting input being coupled to one of said adding means; means for variably biasing said remaining inverting and non-inverting inputs; a second AND gate having an inverting and a non-inverting inputs, and an output coupled to said inhibit input; said second AND gate non-inverting input being coupled to the remaining adding means; means for variably biasing said second AND gate inverting input.

* * * * *